United States Patent
Preisner et al.

(10) Patent No.: US 7,329,205 B2
(45) Date of Patent: Feb. 12, 2008

(54) DRIVE TRAIN HAVING A TWIN-CLUTCH TRANSMISSION AND A METHOD FOR CONTROLLING THE SAME

(75) Inventors: Marian Preisner, Buehl (DE); Reinhard Berger, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 262 days.

(21) Appl. No.: 11/264,274

(22) Filed: Nov. 1, 2005

(65) Prior Publication Data

US 2006/0122031 A1    Jun. 8, 2006

Related U.S. Application Data

(63) Continuation of application No. PCT/DE2004/000819, filed on Apr. 20, 2004.

(30) Foreign Application Priority Data

May 2, 2003 (DE) ............... 103 19 621

(51) Int. Cl.
*B60W 10/00* (2006.01)
*F16H 59/00* (2006.01)

(52) U.S. Cl. .................................. 477/80; 74/335
(58) Field of Classification Search .................. 477/79, 477/80; 74/331, 335
See application file for complete search history.

(56) References Cited

U.S. PATENT DOCUMENTS 7,252,621 B2 * 8/2007 Tanba et al. .................. 477/77

FOREIGN PATENT DOCUMENTS

| DE | 38 12 327 | 6/1989 |
|---|---|---|
| DE | 199 11 027 | 9/2000 |
| DE | 100 15 296 | 8/2001 |

* cited by examiner

*Primary Examiner*—Dirk Wright
(74) *Attorney, Agent, or Firm*—Simpson & Simpson, PLLC

(57) ABSTRACT

The invention relates to a drive train having a twin-clutch transmission and to a method for controlling the same.

20 Claims, 3 Drawing Sheets

DRIVE TRAIN HAVING A TWIN-CLUTCH TRANSMISSION AND A METHOD FOR CONTROLLING THE SAME

CROSS REFERENCE TO RELATED APPLICATIONS

This application is filed under 35 U.S.C. § 120 and § 365(c) as a continuation of International Patent Application PCT/DE2004/000819, filed Apr. 20, 2004, which application is incorporated herein by reference. This application also claims priority of German Patent Application No. DE 103 19 621.8, filed May 2, 2003, which application is incorporated herein by reference.

FIELD OF THE INVENTION

The invention relates to a drive train in a motor vehicle having an internal combustion engine, a twin-clutch transmission having two transmission input shafts, each of the two transmission shafts being coupleable via a friction clutch to the crankshaft of the internal combustion engine.

BACKGROUND OF THE INVENTION

Drive trains of this type having a twin-clutch transmission comprising at least two transmission input shafts are known and by means of an automated transmission actuation system are used in such a manner that when the clutch of the first transmission input shaft is engaged the vehicle is driven via a gear or gear ratio step that is disposed and engaged between this transmission input shaft and a transmission output shaft, while on the other transmission input shaft with the clutch disengaged the next gear is already selected. Systems of this type also allow the motor vehicle to start out using different starting gear ratios, depending on the load state and/or inclinations of the road, it being possible to use a lower ratio of a first transmission input shaft or a higher ratio on the other transmission input shaft to start out. In this context the loading state of the vehicle and in some cases the incline of the road is determined via suitable detection devices or selectable by the driver from a choice of starting gear ratios. However, there are costs connected with the preparation of detection devices of this type, and they are accordingly expensive; having the driver enter the information is inconvenient and prone to error.

SUMMARY OF THE INVENTION

It is therefore the object of the invention to propose a selection mechanism that can do without additional detection devices and is accordingly inexpensive. Another partial objective is the protection of the vehicle from overload during the starting off operation. Moreover, a possibility for deciding the starting gear ratio to be used for starting out that is low on wear and requires little maintenance is to be identified.

The objective is achieved via a drive train in a motor vehicle that includes an internal combustion engine controlled via a load demand device and an automated-actuation twin-clutch transmission having a first and a second transmission input shaft, each of which is coupleable via a first and a second friction clutch to a crankshaft of the internal combustion engine, at least one first set of gear pairs that is engageable between the first transmission input shaft and one transmission output shaft and has a first gear pair with a first starting gear ratio and at least one second set of gear pairs that is engageable between the second transmission input shaft and the transmission output shaft and has a second gear pair with a starting gear ratio different than the first being provided, and during a starting out operation of the motor vehicle in a first phase, the first and the second gear pair between the transmission input shafts and the transmission output shaft being engaged and both friction clutches being coupled to the internal combustion engine in a slipping state, and in a second phase one friction clutch being disengaged and the other completely engaged, in the first phase the acceleration of the motor vehicle being estimated using at least one parameter derivable directly from the drive train and a decision being made using this estimate about which of the two starting ratios of the starting out operation is continued after completion of the first phase. In this manner it is possible to assess the acceleration performance of the vehicle and, thus, the moment of inertia independent of sensor signals related to the vehicle weight and the incline of the road using just information that is available in the drive train anyway, so that it is possible to start out with the optimal starting gear ratio.

One parameter for the assessment of the driving behavior, such as the acceleration of the vehicle, can be the evaluation of the clutch torque transmissible via one or both friction clutches or the energy input into one or both friction clutches. These clutch torque values may be measured directly, for example, via clutch torque sensors or preferably be determined from the clutch torque acquired as a function of the position of a load demand device from a characteristic map at a prescribed friction value. In so doing, the friction value may be determined, in turn, from the degree of disengagement of the clutch, it being possible to correspondingly adapt appropriate clutch friction values that over the service life of the vehicle are a function of different parameters, such as clutch temperature, operating time, wear state and the like. The degree of disengagement of the clutch may be acquired from the signals of a displacement sensor of the clutch positioner, for example, of an electric, hydraulic, electrohydraulic or pneumatic actuator, it being possible even at that time, when electric motors are used, for the number of revolutions and back analysis using the active gear ratio between motor and clutch for the disengagement of the clutch or other electrical variables, such as current, voltage, wattage, pulse width variation and the like, to represent a measure of displacement. Specifically, the number of revolutions of the motor is counted and using a known gear ratio between the motor and a release bearing of the clutch (converting revolutions to axial displacement), the back analysis of the degree of disengagement (axial displacement divided by the maximal displacement) can be performed.

Moreover, the clutch temperature of one or both clutches may be used as a parameter. In this manner, it is possible to decide which of the two clutches is the appropriate clutch for starting out under thermal assumptions. In this context, it is possible to take into consideration the cumulative effect of the clutch heating up if, for example, there is a plurality of starting gears one behind the other. This clutch temperature may constitute the parameter by itself or be modified as a function of additional parameters such as the position of the load demand device, the acceleration of the vehicle or the like. In this context, the clutch temperature may be detected directly via one or more clutch temperature sensors or be determined using a modeling approach, such as from the entered torque values and the friction loss.

According to the theory of the invention, the parameter may also be determined from a speed that is achieved in a prescribed time interval after the beginning of the starting out operation. Of course, the parameter in this context may also advantageously be as an inverse function since the speed is prescribed and a corresponding time period, which is needed until reaching this speed as a function of the position of the load demand device, is evaluated.

Moreover, the parameter from a linking of the engine reference speed to the transmission input shaft speed may be determined, for example, by formation of a difference between the engine reference speed and the transmission input shaft speed. The use of the engine reference speed instead of the current engine speed is advantageous in that the engine reference speed, which is a function of the position of the load demand device, enables a more forward-looking regulation of the clutches than the engine speed that is actually present.

Altogether, it is advantageous to subdivide the starting out operation into two phases, it being possible for the first phase to represent a so-called search phase because the decision is made about which starting gear ratio is to be used for starting out. In the logic of the invention, this first phase is advantageously time-limited in such a way that the decision may be made no later than when the engine speed equals the transmission input shaft speed of the transmission input shaft having the smaller starting gear ratio. In this process, the end of the first phase may be determined from the quotient of, on the one hand, the difference between a reference speed of the internal combustion engine prescribed by the load demand device and the speed of the transmission input shaft having the low starting ratio and, on the other hand, the acceleration of the first transmission input shaft. Another possibility for limiting the first phase may be provided by ensuring that the speed differential between the engine reference speed and the transmission input shaft having the lesser starting ratio does not fall below a prescribed value. If the aforementioned maximum time is exceeded, the starting out operation having the lesser starting gear ratio is advantageously continued and the clutch for the transmission input shaft is disengaged using the greater starting gear ratio. A continuation of the starting out operation using the lower starting gear ratio may occur if at least one of the following conditions is satisfied:

the starting out time until reaching a prescribed speed differential, calculated from the engine reference speed and the speed of one of the transmission input shafts, is exceeded;

a theoretical acceleration time until the speed equivalency between crankshaft and the transmission input shaft having the greater starting gear ratio is exceeded;

in the friction clutch of the transmission input shaft having the greater starting gear ratio, energy is input that is greater than a prescribed energy limit value;

the temperature of the friction clutch of the transmission shaft having the greater starting gear ratio exceeds a prescribed temperature limit value;

the acceleration of the vehicle is less than a prescribed limit acceleration.

In this context, it may be advantageous if the starting out time and/or the theoretical acceleration is set as a function of the degree of actuation of the load demand device. The energy limit value may advantageously be set as a function of the energy input in the friction clutch of the transmission input shaft having the lesser starting gear ratio. The temperature limit value may be set as a function of the clutch temperature in the friction clutch of the transmission input shaft having the lower starting gear ratio.

BRIEF DESCRIPTION OF THE DRAWINGS

The invention is explained in detail in relation to FIGS. 1 to 4. Shown are.

DETAILED DESCRIPTION OF THE INVENTION

Figure 1:
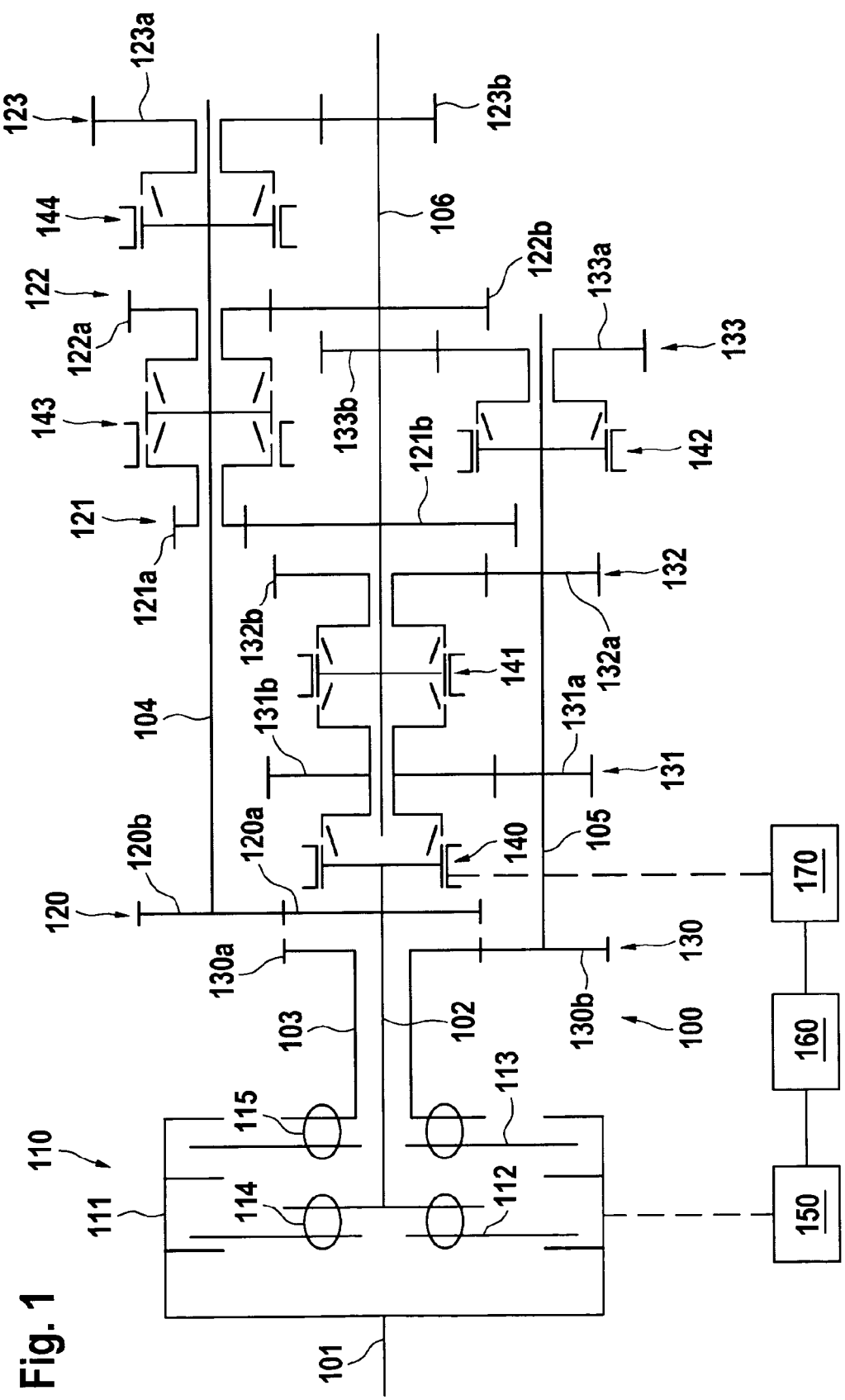
FIG. 1 illustrates the diagrammatic representation of a twin-clutch transmission.

FIG. 1 is a diagrammatic representation of a present invention drive train having a twin-clutch transmission 100. In FIG. 1, drive train 100 is in a great range of known structures of a twin-clutch transmission. Of course the starting control according to the theory of the invention is applicable for all twin-clutch transmissions having two gear sets on each transmission input shaft and therefore this exemplary embodiment must not in any way be considered as limiting the invention. Via a driving engine, a shaft 101 is driven that is connected to housing 111 of a clutch assembly 110 designed as a twin clutch. Clutch housing 111 may be connected to a first clutch plate 112 and/or a second clutch plate 113. Both clutch plates 112, 113 may contain devices for vibration damping 114, 115. The two friction clutches are advantageously independent of each other via the actuator system 150, which may be configured electrically with an electric motor that acts on the disengagement mechanics directly or via a transmission, a piezoelectric element or the like, electrohydraulically via a master/slave cylinder system having an electric motor that acts on the master cylinder, or pneumatically. The actuator system 150 is controlled as a function of the operating situation of the motor vehicle by the controller 160, in which the corresponding characteristics and information about the operation of the friction clutches are stored and/or which has communication links to other controllers in order to query the corresponding information and to evaluate it for the control process. In particular, the data for the starting out operation of the motor vehicle are processed in controller 160.

With first clutch plate 112, a first transmission input shaft 102 is drivable that drives a first countershaft 104 via gear pair 120 that is formed of gear wheels 120*a* and 120*b*. First countershaft 104 carries idler gears 121*a*, 122*a* and 123*a* of the gear pairs 121, 122 and 123, which form gears 1, 3 and 5 (not shown). Gear 1 in this context is understood to be a starting gear having the corresponding starting gear ratio. The idler gear 121*a*, 122*a* and 123*a* may be rotationally fixedly connected via manual clutches 143 and 144 to the countershaft 104.

A second transmission input shaft 103 may be driven via the second clutch plate 113 and drives a second countershaft 105 via gear pair 130, which is formed by gear wheels 130*a* and 130*b*. Second countershaft 105 carries gear wheels 131*a* and 132*a* and idler gear 133*a* of gear pairs 131, 132 and 133, which form gears 2, 4 and 6 (not shown). In this context, gear 2, having a greater ratio than gear 1, must be considered the starting gear of transmission input shaft 103. Gear wheels 131a and 132a are rotationally fixedly connectable to countershaft 105; idler gear 133a is connectable to it via a shift clutch 142.

Idler gears 131b and 132b of gears 2 and 4 and gear wheels 121b, 122b, 123b and 133b of gears 1, 3, 5 and 6 are disposed on output shaft 106, gear wheels 121b, 122b, 123b and 133b being rotationally fixedly connected to output shaft 106, and idler gears 131b and 132b being rotationally fixedly connectable to it via a shift clutch 141.

Moreover, a shift clutch 140 is present for connection of second input shaft 103 to first countershaft 104 or, respectively, first input shaft 102 to second countershaft 105.

Shift clutches 141, 142, 143 and 144 each connect idler gears 121a, 131b, 122a, 132b, 123a and 133a to shafts 104, 105 or 106 via a sliding sleeve and a coupling part that is rotationally fixedly connected to the shaft. Shift clutch 140 connects gear wheel 120a to idler gear 131b via a sliding sleeve. Shift clutches 140, 141, 142, 143 and 144 may contain elements for the speed synchronization. Shift clutches 140, 141, 142, 143 and 144 are automatically actuated via transmission actuators 170, which, as shown in the example of shift clutch 140, electrically, hydraulically or pneumatically displace the sliding sleeves of the shift clutches.

Figure 2:
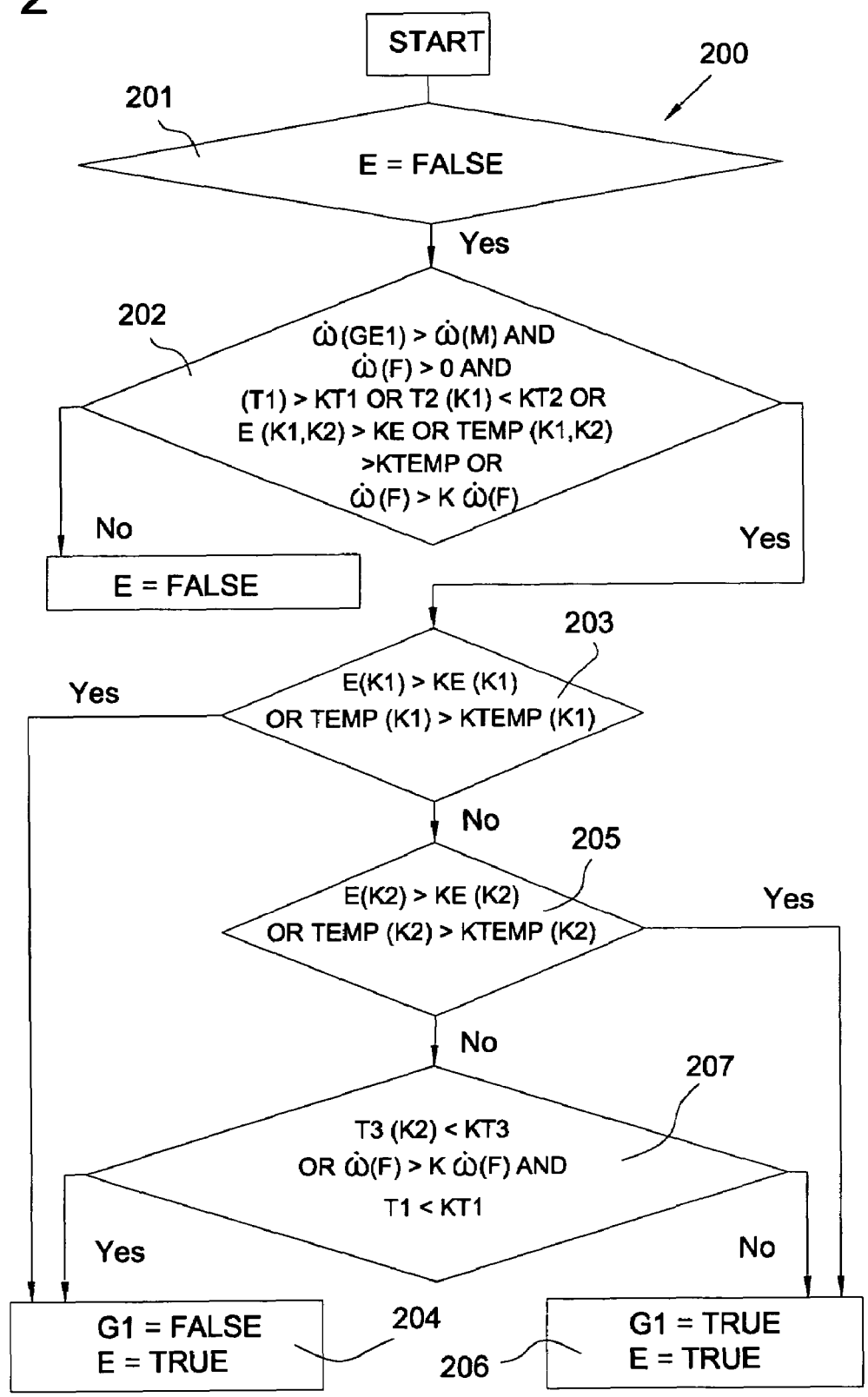
FIG. 2 illustrates a flow chart for using the invention in the transmission represented in FIG. 1.

FIG. 2 illustrates a flow chart for using the invention in the transmission represented in FIG. 1. The following should be viewed in light of FIGS. 1 and 2. According to the invention, starting out is preferably accomplished in such a manner that gear 1 is engaged by connecting idler gear 121a via shift clutch 143 to countershaft 104 and gear 2 by connecting the idler gear 131b via the shift clutch 141 to output shaft 106, and, by slipping operation of the two clutch plates 112, 113, torque is transmitted by crankshaft 101 via transmission input shafts 102, 103, countershafts 104, 105 and engaged gears 1 and 2 to the transmission output shaft and from there to the driving wheels. According to the flow chart of FIG. 2, a decision is made about how the starting out operation proceeds.

Alternatively, when the starting out situation in a pre-defined gear is clear, if the incline conditions of the road and the load conditions are clear or if so desired by the driver, it is possible to start out as follows: to start out in first gear, idler gear 121 is rotationally fixedly connected via shift clutch 143 to countershaft 104, shift clutch 144 being disengaged and drive shaft 101 being connected to first input shaft 102 via first clutch plate 112 of clutch assembly 110. For an upshift into $2^{nd}$ gear, idler gear 131b is rotationally fixedly connected via shift clutch 141 to output shaft 106, shift clutch 142 being disengaged, drive shaft 101 being separated from first input shaft 102 by release of first clutch plate 112 from clutch housing 111 and drive shaft 101 being connected to second input shaft 103 via second clutch 113. Also, in all other upshifts and downshifts, the procedure is such that the flow of torque is diverted from one countershaft to the other, the corresponding shift clutches being engaged or disengaged.

FIG. 2 shows a flow chart having a starting routine 200 of a first phase of a starting out operation that is run repeatedly until decision signal E, which in starting block 201 is set to FALSE, contains the value TRUE. In block 201 a check is made of whether acceleration $\dot{\omega}(GE1)$, that is, the speed change over time, of a transmission shaft—in this case transmission shaft GE1 having the lower starting gear ratio—is greater than acceleration $\dot{\omega}(M)$ of the engine or the crankshaft and acceleration $\dot{\omega}(F)$ of the vehicle is greater than zero, it being possible to determine the acceleration of the vehicle via speed gradients of one or more wheel speed sensors in order to do without an acceleration sensor. In this context, a check is made of whether the vehicle has begun operation, according to which both starting gears have been engaged and clutches K1 and K2 in slipping operation begin to engage. If one of the two conditions is not satisfied, starting routine 200 will run again. If both conditions and one of the following conditions is also satisfied, starting routine 200 is continued in block 203, which means that a decision is posed:

Starting out time T1 is greater than a prescribed maximum starting out time KT1, it being possible for KT1 to be an empirical value formed from the vehicle empty weight, the position of the load demand device when applicable and other parameters and whereupon the cases of a decision at too early a time are prevented, or time T2(K1) as function $$T2(K1)=(n(M)-n(GE1))/\dot{\omega}(GE1)$$

until reaching a prescribed, low, preferably negligible speed difference between a reference engine speed n(M) and speed n(GE1) of transmission input shaft GE1 is smaller than a prescribed time threshold KT2 (e.g. 100-500 ms, preferably approx. 250 ms), which is a function of the position of the load demand device, it being possible to determine the speed of the transmission input speed and its derivation after time $\dot{\omega}(GE1)$ from the information of one or more wheel speed sensors in conjunction with the gear ratio engaged in the transmission and a decision being initiated before a synchronization speed between the crankshaft and transmission input shaft GE1 has occurred, or an energy value E(K1, K2) input in clutches K1, K2 is greater than a prescribed energy value KE, which may be set constant or be set as a function of the position of the load demand device, or a clutch temperature value TEMP(K1, K2) determined via a temperature sensor or a model calculation and affecting one or both clutches K1, K2 is greater than a prescribed clutch temperature value KTEMP. or acceleration $\dot{\omega}(F)$ of the vehicle is greater than a prescribed limit acceleration K $\dot{\omega}(F)$, which may correspond, for example, to the acceleration of the vehicle with partial or full load and/or may correspond to the driving resistance at a prescribed inclination.

In block 203, a decision is made that, at an energy input E(K1) in clutch K1 greater than a prescribed threshold value KE(K1) or at a clutch temperature TEMP(K1) of clutch K1 above a prescribed temperature threshold value KTEMP (K1), decision signal E is set to TRUE, and the decision is made to start off with the greater gear ratio of transmission input shaft GE2, which is signaled by setting the gear signal G1=FALSE in block 204, and clutch K1 separates transmission input shaft GE1 having the lower starting gear ratio from the motor.

If neither energy input E(K1) on clutch K1 is greater than threshold value KE(K1) nor clutch temperature TEMP(K1) of clutch K1 greater than threshold value KTEMP(K1), the characteristics of clutch K2 are checked in block 205. If in clutch K2 an energy input E(K2) greater than a prescribed threshold value KE(K2) is entered or if clutch temperature KTEMP(K2) is greater than prescribed threshold value KTEMP, in block 206 the shift signal G1 and the decision signal are each set to TRUE, which means that operation of the vehicle is continued after the decision phase in the lower gear, which means with the lower starting gear ratio, and clutch K2 is disengaged.

If energy input E(K2) and clutch temperature TEMP(K2) are less than the corresponding threshold values KE(K2), KTEMP(K2), the decision is made regarding the appropriate starting gear ratio in block 207. If time T1, which was previously explained in greater detail, is less than the defined threshold value KT1 and one of the following conditions is satisfied, for a greater time, none of the conditions apply, the vehicle starts out at a lower starting gear ratio, decision signal E and gear signal G1 being set accordingly in blocks 204, 206:

Time T3 (K2) as per the equation $$T3(K2)=(n(M)-n(GE))/\dot{\omega}(GE2),$$

at which for a prescribed acceleration of the transmission input shaft 6) (GE2), which, like the acceleration of transmission input shaft GE1, may be determined from information of the wheel speeds, speed equivalency is practically achieved between the engine reference speed n(M) and the speed of the transmission input shaft GE2 having the greater starting gear ratio is less than a threshold value KT3 or the acceleration $\dot{\omega}(F)$ of the vehicle is greater than a prescribed limit acceleration K $\dot{\omega}(F)$, which may correspond, for example, to the acceleration of the vehicle having a partial or full load and/or may correspond to the driving resistance at a prescribed inclination.

As soon as the decision is made by setting the decision signal E, the first phase is terminated and corresponding to the set gear signal one of clutches K1, K2 is disengaged and the starting out operation is continued in the second phase with the other clutch.

Figure 3:
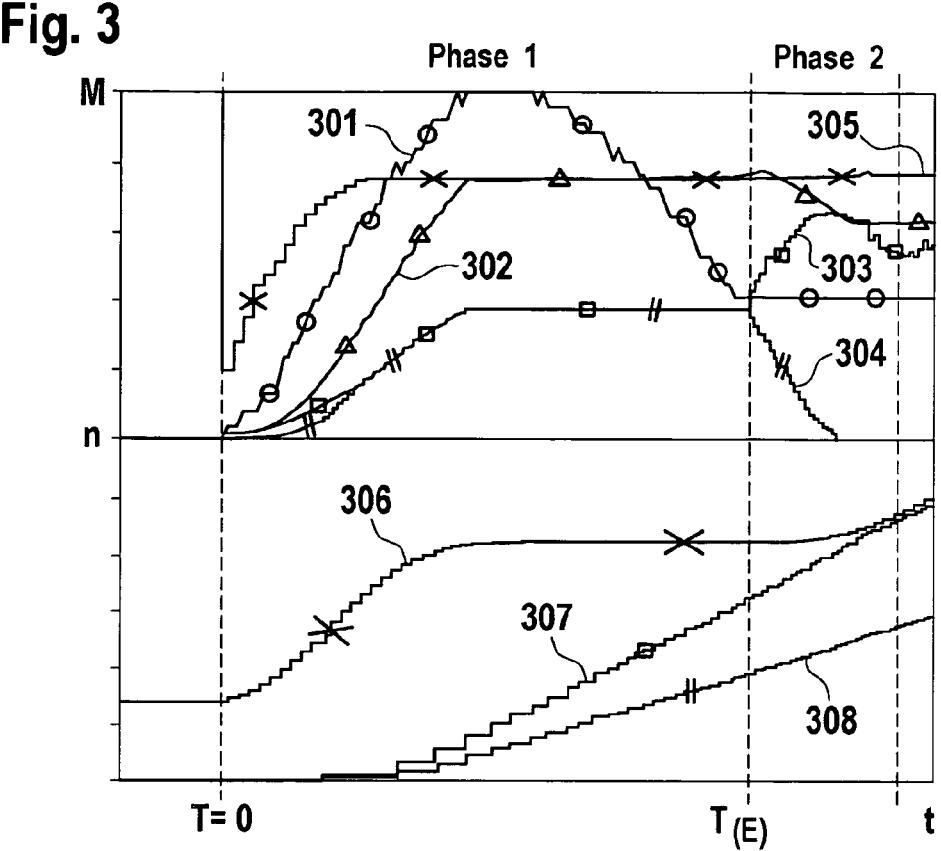
FIG. 3 illustrates a diagram for representing the torque and speed values in the starting out operation using the lower gear ratio; and, FIG. 4 illustrates a diagram for representing the torque and speed values in the starting out operation with the greater gear ratio.

FIG. 3 shows a diagram having torque characteristics M and associated speeds n in time sequence t of a starting out operation. In this context curve 301 shows the maximum computer-calculated torque M(T) transmissible via clutch K1 that is assigned to the transmission input shaft GS1 having the lower starting gear ratio and is at least a function of the slipping speed between crankshaft and transmission input shaft GE1, the actuator speed with which clutch K1 may be actuated, the position of the load demand device and an acceleration determined in real time of transmission input shaft GE1. In this way it is possible using torque M(T) to provide a dimension for this, which clutch torque may be transmitted via a clutch actuation system having an adjustment speed adapted for the system when there is a progression of the coupling operation of clutch K1 in phase 1 in which there is a starting out operation with both clutches K1, K2 in order to start out with clutch K2 when there is a decision and in the process still be able to disengage clutch K1 without clutch K1 already being located in the gripping phase (negligible slip between crankshaft and transmission input shaft GE1) within the time of the decision phase that still remains (Phase 1).

Total clutch torque M(G) in curve 302 is essentially composed of the two clutch torque values M(K1), M(K2) of clutch K1 (curve 303) and clutch K2 (curve 304) added together and is advantageously controlled in such a manner that after the vibration it corresponds to the engine torque M(M) (curve 305).

At the beginning of the starting out operation at T=0, by operating the load demand device, which may be an accelerator pedal, gas pedal or the like, the speed n(M) of the engine (curve 306) increases and as a result of the immediate start of the clutch engagement operation of clutches K1, K2, speeds n(GE1), n(GE2) of transmission input shaft GE1 having the lower starting gear ratio (curve 307) and transmission input shaft GE2 (curve 308) are also increased. The different speeds n(GE1), n(GE2) result from the different gear ratios of the engaged gear steps and are compensated by different slip speeds of clutches K1, K2. During phase 1, a decision at instant T(E) is made to start out in the lower starting gear ratio of transmission input shaft GE1. Clutch K2 is disengaged and torque M(K2) is reduced while the torque M(K1) is increased. At least one of the criteria described under FIG. 2 is considered as a decision criterion, it being possible to select constant KT2 in such a manner that a decision falls within the time range in which the two torques M(T), M(K1) are essentially equal. Time t between the beginning of the starting operation T=0 and decision T(E) is a function of vehicle, load and incline, values between 0.5 and 10 seconds having shown themselves to be approximate guideline values.

Figure 4:
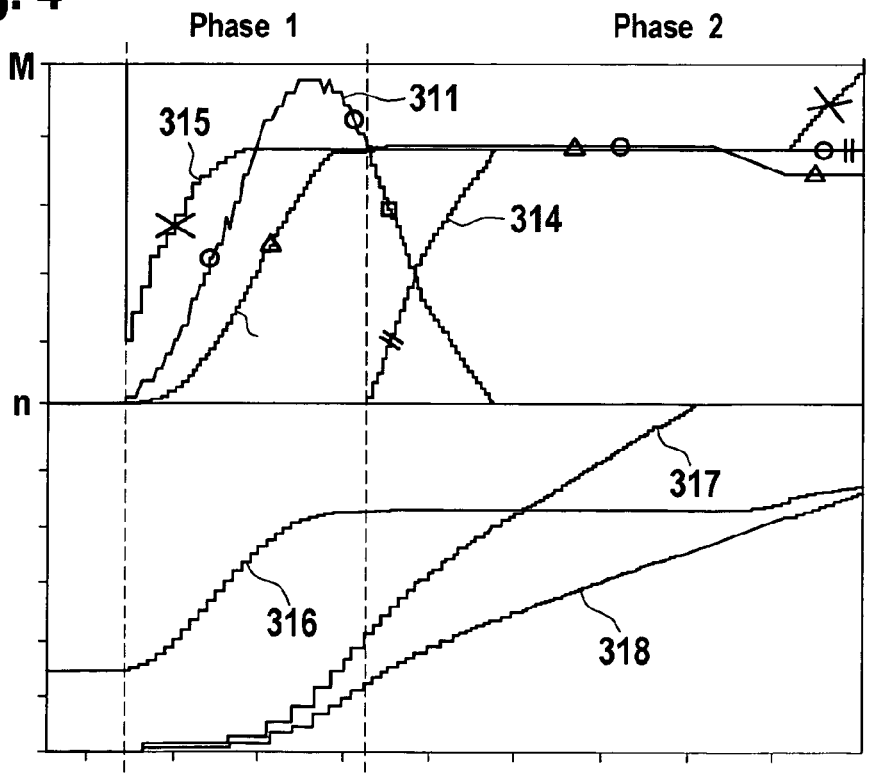

FIG. 4 shows a diagram corresponding to FIG. 3 in which a decision in favor of starting out in the greater starting gear ratio is made. The corresponding curve designations were increased by 10 compared to FIG. 3 and in all other respects correspond to them. Due to the low load and/or driving under road inclination conditions that are reduced in terms of the load resistance (slight incline, level, downgrades), the vehicle accelerates very rapidly, so that the corresponding parameters described under FIG. 2 (short acceleration times of the vehicle, low energy inputs in the clutch, low heating of the clutches) very quickly leads to a decision in favor of the higher starting gear ratio so that phase 1 ends up being correspondingly short and phase 2 until speed equivalency of transmission input shaft GE2 and the crankshaft ends up being longer.

What is claimed is:

1. A drive train in a motor vehicle having an internal combustion engine controlled via a load demand device and an automated-actuation twin-clutch transmission having a first and a second transmission input shaft, each of which is coupleable via a first and a second friction clutch to a crankshaft of the internal combustion engine, having at least one transmission output shaft and at least one first set of gear pairs engageable between the first transmission input shaft and the at least one transmission output shaft that has a first gear pair with a first starting gear ratio and at least one second set of gear pairs engageable between the second transmission input shaft and the at least one transmission output shaft that has a second gear pair with a starting gear ratio different than the first gear pair, wherein during a starting out operation of the motor vehicle in a first phase the first and the second gear pair are engaged between the transmission input shafts and the at least one transmission output shaft and both friction clutches are coupled to the internal combustion engine in a slipping state, and in a second phase one friction clutch is disengaged and the other is engaged, the acceleration of the motor vehicle in the first phase being estimated using at least one parameter that is directly derivable from the drive train and a decision being made using this estimate about which of the two starting gear ratios of the starting out operation is to be continued after completion of the first phase.

2. The drive train as described in claim 1, wherein the parameter is a clutch torque transmitted during the starting out operation via at least one friction clutch.

3. The drive train as described in claim 2, wherein the transmitted clutch torque is determined from an engine torque applied to the at least one friction clutch and a friction coefficient thereof.

4. The drive train as described in claim 3, wherein, the friction coefficient is a computerized adaptable quantity and is a function of the degree of disengagement of the at least one friction clutch.

5. The drive train as described in claim 1, wherein the parameter is a clutch temperature determined during the starting out operation.

6. The drive train as described in claim 5, wherein the clutch temperature is measured via a temperature sensor or determined via a thermal model.

7. The drive train as described in claim 1, wherein the parameter is a time interval determined as a function of the position of the load demand device in which a prescribed speed of the motor vehicle is achieved from the beginning of the starting out operation.

8. The drive train as described in claim 1, wherein the parameter is a speed determined as a function of the position of the load demand device that is achieved within a prescribed time interval after the beginning of the starting out operation.

9. The drive train as described in claim 1, wherein the parameter is determined from an engine reference speed and one of the transmission input shaft speeds.

10. The drive train as described in claim 9, wherein the parameter is formed from the difference of engine reference speed and transmission input shaft speed.

11. The drive train as described in claim 1, wherein the first phase has a time-limited prescribable period.

12. The drive train as described in claim 11, wherein the time-limited period is calculated from the quotient of the difference between a reference speed of the internal combustion engine prescribed by the load demand device and the speed of the transmission input shaft having the lower starting gear ratio and the acceleration of the first transmission input shaft.

13. The drive train as described in claim 11, wherein the period is limited by a prescribable maximum value.

14. The drive train as described in claim 12, wherein the first phase after the decision is made is terminated no later than when the transmission input shaft having the lower gear ratio has reached the current speed of the internal combustion engine.

15. The drive train as described in claim 1, wherein a decision is made to start the motor vehicle in a lower starting gear ratio if at least one of the following conditions is satisfied:
the starting out time until reaching a prescribed speed differential, calculated from the engine reference speed and speed of one of the transmission input shafts, is exceeded;
a theoretical acceleration time until the speed equivalency between crankshaft and the transmission input shaft having the greater starting gear ratio is exceeded;
the acceleration of the vehicle is less than a prescribed limit acceleration;
in the friction clutch of the transmission input shaft having the greater starting gear ratio, energy is input that is greater than a prescribed energy limit value; or,
the temperature of the friction clutch of the transmission shaft having the greater starting gear ratio exceeds a prescribed temperature limit value.

16. The drive train as described in claim 15, wherein the starting out time and/or the theoretical acceleration time are set as a function of the degree of actuation of the load demand device.

17. The drive train as described in claim 15, wherein the energy limit value is set as a function of the energy input in the friction clutch of the transmission input shaft having the lower starting gear ratio.

18. The drive train as described in claim 15, wherein the temperature limit value is set as a function of the clutch temperature determined in the friction clutch of the transmission input shaft having the lower starting gear ratio.

19. The drive train as described in claim 1, wherein the parameter is a vehicle acceleration determined during the starting out operation.

20. A method for controlling a twin-clutch transmission in a drive train in a motor vehicle having an internal combustion engine controlled via a load demand device and an automated-actuation twin-clutch transmission having a first and a second transmission input shaft, each of which is coupleable via a first and a second friction clutch to a crankshaft of the internal combustion engine, having at least one transmission output shaft and at least one first set of gear pairs engageable between the first transmission input shaft and the at least one transmission output shaft that has a first gear pair with a first starting gear ratio and at least one second set of gear pairs engageable between the second transmission input shaft and the at least one transmission output shaft that has a second gear pair with a starting gear ratio different than the first gear pair, comprising:
engaging, during a starting out operation of the motor vehicle in a first phase, the first and the second gear pair between the transmission input shafts and the at least one transmission output shaft;
estimating the acceleration of the motor vehicle in the first phase using at least one parameter that is directly derivable from the drive train;
coupling both friction clutches to the internal combustion engine in a slipping state; and,
in a second phase, disengaging one friction clutch, engaging the other friction clutch, and determining, using said estimated acceleration, which of the two starting gear ratios of the starting out operation is to be continued after completion of the first phase.

* * * * *

UNITED STATES PATENT AND TRADEMARK OFFICE
CERTIFICATE OF CORRECTION

| | |
|---|---|
| PATENT NO. | : 7,329,205 B2 |
| APPLICATION NO. | : 11/264274 |
| DATED | : February 12, 2008 |
| INVENTOR(S) | : Marian Preisner and Reinhard Berger |

It is certified that error appears in the above-identified patent and that said Letters Patent is hereby corrected as shown below:

Column 7, line 15, "input shaft 6) (GE2), which, like the acceleration of"

should be changed to

-- input shaft $\dot{\omega}$ (GE2), which, like the acceleration of --

Signed and Sealed this

Twenty-fourth Day of June, 2008

JON W. DUDAS
*Director of the United States Patent and Trademark Office*